Nov. 29, 1960  E. T. TIDD  2,962,311
RESILIENT BUSHING FOR CONNECTING MACHINE ELEMENTS
Filed June 26, 1958  2 Sheets-Sheet 1
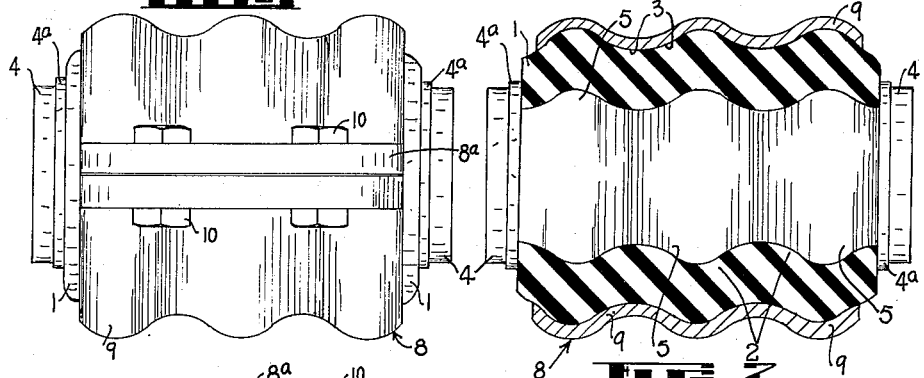
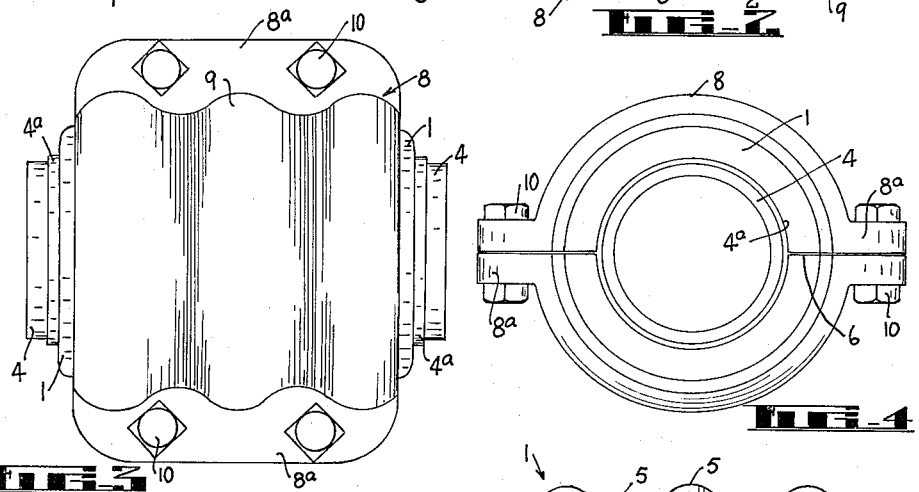
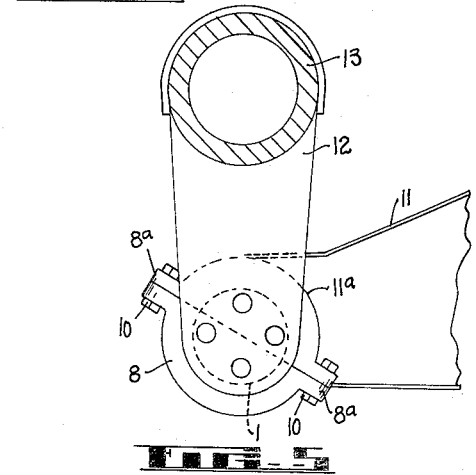
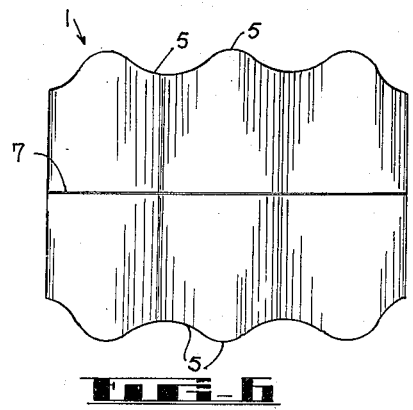
EDWIN T. TIDD
INVENTOR
BY Wenderoth, Lind &d Ponack
ATTORNEYS Nov. 29, 1960            E. T. TIDD            2,962,311
RESILIENT BUSHING FOR CONNECTING MACHINE ELEMENTS
Filed June 26, 1958            2 Sheets-Sheet 2
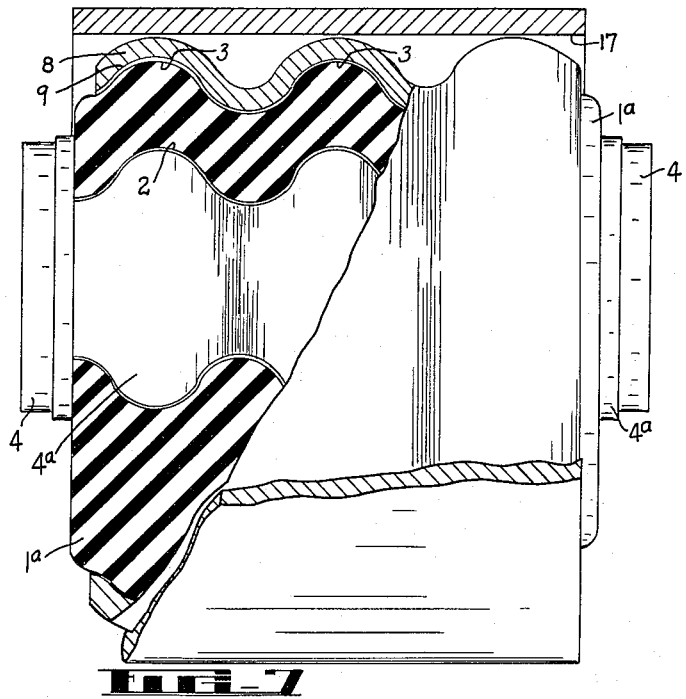
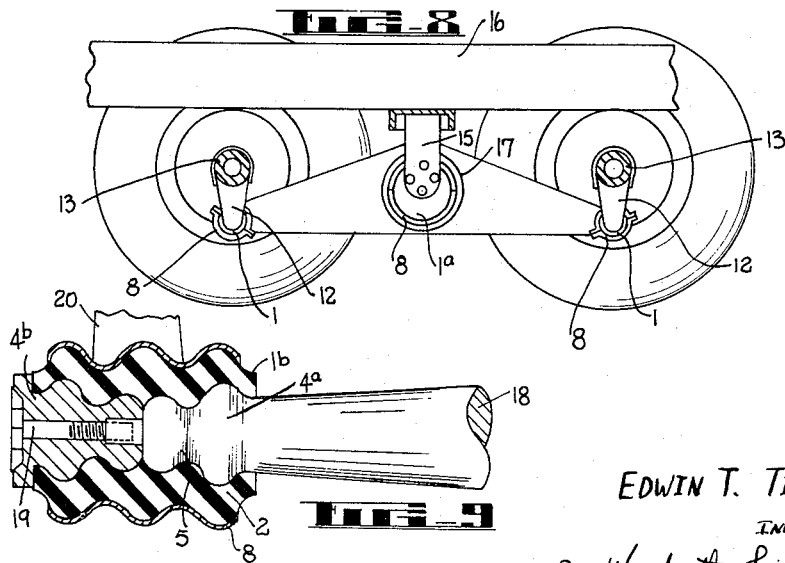
EDWIN T. TIDD
INVENTOR
BY Wenderoth, Lind &d Ponack
ATTORNEYS

2,962,311
Patented Nov. 29, 1960

2,962,311

RESILIENT BUSHING FOR CONNECTING MACHINE ELEMENTS

Edwin Thornton Tidd, 1 Kotahi St., Hamilton, New Zealand

Filed June 26, 1958, Ser. No. 745,140

Claims priority, application New Zealand June 26, 1957

4 Claims. (Cl. 287—85)

The invention relates to bushings and in particular relates to bushings formed of resilient material which are used extensively in relation to all classes of mechanisms and the like whereby one part which may be called the "mounted" part is secured to another part which may be called the "mounting" part in such a manner that the bearing permits resilient non-rigid mounting.

The primary object of the present invention is to provide an improved bushing which is capable of withstanding heavy loads, and stresses and strains as applied from any angle and moreover because of these improved characteristics, provides a comparatively simple general simplification of the bushing mechanisms which are normally associated with standard types of bushing or mounting means.

Resilient bushings of rubber material are used extensively on motor vehicles usually for the mounting of the chassis of the vehicle to the axles and wheels and are used also for a variety of other purposes which are usually mechanical under the general term of "rubber mounting," it being recognized that there are benefits in rubber mounting not obtainable by spring mounting or other known forms of mounting.

These known rubber bushings are usually in the form of bushings and are commonly of plain cylindrical form adapted to fit over a pin or shaft and are enclosed within a housing and while these are effectively yieldingly resistant to stresses and strains in the vertical direction, they are ineffective against these forces when applied in the horizontal direction or at an angle to the horizontal and therefore, particularly for motor vehicles, other means have to be used to take care of such forces.

Furthermore, the efficient load carrying capacity of these known rubber bushings is substantially limited in that there is no restraint on the elastic movement of the rubber in a horizontal direction.

My invention has been devised to provide an improved bushing constructed and arranged in such a manner as to enable the bushing to withstand greatly increased loads and take stresses and strains which may be applied thereto from any direction.

According to the invention the improved bushing comprises a bushing of resilient material provided with a bore therethrough, a series of corrugations formed in the bore of the bushing and also formed about the exterior surface of the bushing, a pin or shaft also shaped with corrugations and extending through the bore and with the corrugations of the pin or shaft being in registration with the corrugations of the bore of the bushing, and an outer housing or casing fitted about the exterior surface of the bushing and formed with corrugations on the interior surface of the housing or casing which are in registration with the corrugations on the exterior surface of the bushing.

The invention will now be described with reference to the accompanying drawings in which:

Fig. 1 is a view in elevation of one form of the invention.

Fig. 2 is a similar view to Fig. 1 in section.

Fig. 3 is a plan view of Fig. 1.

Fig. 4 is an end view in elevation of Fig. 1.

Fig. 5 illustrates the form of the invention shown in Fig. 1 mounted in position in a beam and supporting an axle.

Fig. 6 illustrates an alternative form of rubber bushing.

Fig. 7 is a view in elevation and partly in cross section of a second form of the invention.

Fig. 8 is a part view of the chassis of a motor vehicle illustrating the two forms of the invention shown in Fig. 1 and Fig. 7 mounted in position in support of the axles of the vehicle.

Fig. 9 illustrates in cross section a third form of the invention supporting an axle or beam.

In the form of the invention illustrated from Figs. 1 to 5 of the drawings, the bushing 1 is made of rubber and is in the form of a sleeve, the bore of which is provided with a series of curved corrugations 2 shaped in the circular wall or surface of the bore (see Fig. 2) so that from end to end of the bore, there is provided a series of concentric ridges and valleys, or deep cupped corrugations 2. Similarly the exterior surface of the bushing 1 is shaped with a series of curved corrugations 3 extending about the exterior surface of the bushing 1 (see Fig. 2), the corrugations 3 being also in the form of concentric ridges and valleys or deep cupped corrugations 3.

As shown more particularly in Fig. 1, the pin or shaft 4 is also similarly corrugated to engage the corrugations 2 of the bore of the bushing 1. More specifically the corrugations 5 of the pin or shaft 4 are formed about the exterior surface of the pin or shaft 4 and are concentric and correspond in size and shape to the corrugations 2 of the bore of the bushing 1, so that when the bushing 1 is fitted about the pin or shaft 4 (see Fig. 2), the corrugations 2 of the bore of the bushing 1 fit in neat, tight registered valley to ridge engagement in the corrugations 5 of the pin or shaft 4. As illustrated, the pin or shaft 4 is provided with circumferential shoulders 4a toward each end of the pin or shaft 4 between which the bushing 1 fits in neat engagement.

In some cases, due to the resilient nature of the material from which the bushing 1 is made, the bushing 1 may be stretched sufficiently to be forced over the corrugations 5 of the pin or shaft 4 to engage the latter, as has already been described, but in other cases where this is not possible the bushing 1 can be divided by a cut 6 (see Fig. 4) into two similar halves. Or again as shown in Fig. 6, the bushing 1 may be formed with a single cut 7 through one side of the bushing 1 and extending along the length of the bushing 1 in order that the bushing 1 may be opened out to facilitate easy engagement on the pin or shaft 4.

As illustrated in Figs. 1 to 3, the housing 8 of the improved bushing, encircles and encases the exterior circular surface of the bushing 1. More particularly, the housing 8 is circular in shape and is also provided with a series of concentric corrugations 9 formed in the interior surface of the housing 8, the corrugations 9, when the housing 8 is in position on the bushing 1, engaging in neat corresponding ridge in valley registration in the corrugations 3 about the exterior of the bushing 1.

As shown in Figs. 1, 3 and 4 of the drawings, the housing 8 can also be divided into two half sections each formed with flanges 8a, to facilitate positioning of the housing 8 on the exterior surface of the bushing 1. More specifically the two half sections of the housing are engaged on the bushing 1 with the corrugations 3 in engagement with the corrugations 9 and the flanges 8a bolted together by bolts 10 to hold the housing 8 firmly engaged on the bushing 1 with the corrugations as described, in neat tight engagement.

One of the many uses for which the improved bushing is intended, is for the support of an axle of a motor vehicle, as shown in Figs. 5 and 8. In the illustrations mentioned, the exterior surface of one half section of the housing 8 is welded or other-wise fixed as at 11a in the end of a box beam 11 of, say a wheel chassis or support, while brackets or braces 12 fixed to each end of the pin or shaft 4 and projecting from each end of the bushing 1 are secured to the axle 13 for which support is intended.

A variation of the form of the invention as has been described, is illustrated in Figs. 7 and 8. In this instance the bore of the bushing is formed eccentrically relative to the bushing 1a so that a heavier and larger section of rubber is provided between the bore of the bushing and one point of the exterior wall or surface of the bushing 1a, than on the opposing side of the bushing 1a. The bushing 1a as illustrated in Figs. 7 and 8 is encased by a housing 8 and is provided with a pin or shaft 4 fitted therethrough as has already been described.

The bushing illustrated in Figs. 7 and 8 is intended to support heavy loads such as a support for the main beam 11 of a vehicle wheel or under chassis as illustrated in Fig. 8. As shown the housing 8 is fitted into, and fixed by welding, in an opening through the middle of the box beam 11 so that the ends of the brushing project from each side of the box beam 11. Brackets or connecting stays 15 are secured between the ends of the pin or shaft 4 and the main chassis 16 of the vehicle. If desired, a collar or casing 17 may be forced over the housing 8 and the collar or casing 17 welded within the opening in the box beam 11.

As shown in Fig. 8, where weight or pressure is applied to the main chassis 16 in a downward direction onto the beam 11 in forcing the pin or shaft 4 downwardly, the main force or pressure so applied, is borne by the heavy or large area of rubber of the bushing 1a located below the pin or shaft 4.

In a further form of the invention, and as illustrated in Fig. 9 of the drawings the bore of the bushing while continuing to have corrugations 2 formed therein, is formed with a double taper. That is to say the bore is tapered inwardly from each end of the bore so that the bore is greater in diameter at its ends than at its centre. The pin or shaft 4 used in conjunction with the bushing 1b shown in Fig. 9, is likewise shaped with a double tapered formation and furthermore is formed with a detachable section 4b to facilitate its engagement within the bushing 1b. In this latter direction one tapered section 4a of the pin or shaft 4 forms, or is welded to, the end of a beam 18 to be supported, while the remaining tapered section of the pin or shaft 4 is attached to the free end of the pin section 4a after the bushing 1b has been placed in position.

To mount the bushing as illustrated in Fig. 9, on the beam 18, the bushing 1b with the housing 8 already fitted thereabout, is engaged on the fixed pin section 4a so that the corresponding taper of the bore of the bushing engages on the fixed pin section 4a with the corrugations 2 of the bore of the bushing in neat snug registration with the corrugations 5 of the pin section 4a. With the bushing 1b so engaged, the remaining and detachable section 4b of the pin 4, is placed within the remaining and outer taper of the bore of the bushing and secured to the stationary pin section 4a by a bolt or bolts 19 engaged in and passed through the detachable pin section 4b, to lock in screwthreaded engagement within the stationary pin section 4a, thus locking the bushing 1b firmly in position. In this latter form of the invention, suspension brackets 20, providing for the attachment of the beam 18 to a wheel axle, are fixed to the top portion of the housing 8 (see Fig. 9).

The corrugations of the pin or shaft 4, the bushing 1b and the housing 8, are all of curved and of a deep cupped valley and ridge formation and engage in a ridge into valley formation.

It will be appreciated from the aforegoing description that the pin or shaft 4 is usually positioned horizontally, and furthermore the weight of the vehicle or other object which the bushing is supporting, is applied to both the interior surface of the bore and the exterior surface of the bushing. However, as both the bore and the exterior surface of the bushing are shaped with corrugations, a comparatively small bushing will present a much greater bearing surface than would be the case when a plain normal cylindrical bushing is used. Again as the bushing is loaded or compressed to some extent by being compressed between the pin or shaft 4 and the housing 8, a greater load bearing capacity is provided.

While the improved bushing can be used to advantage in the support of stationary objects such as machinery, by reason of its greater load bearing capacity, as has already been mentioned, its paramount advantages is in the support of live or moving loads such as in the support of motor vehicles where the bushing is subjected to vibration, stresses and straining.

In further describing this important aspect of the invention, it will be appreciated that in the support of motor vehicle chassis bogeys and independent wheel chassis, while the main force is applied in a downward direction, pressure or force, during travel of the vehicle, can also be applied not only in a reverse direction, but horizontally as well, which tends to pull or push the pin or shaft 4 in an axial direction or at an angle to the axial direction. It is against the latter forces that the bushing of the present invention enjoys a considerable and notable advantage over the known plain cylindrical sleeve type bushing. When pressure or force is exerted through either the pin or shaft 4 or the housing 8, the corrugations of the bushing sandwiched or encased between the pin or shaft 4 and the housing 8, provide a desirable yielding and resilient cushioning effect to all horizontal and angular movement.

What I do claim and desire to obtain by Letters Patent of the United States of America is:

1. An improved bushing construction comprising, a bushing of resilient material and having a bore therethrough, a series of corrugations formed in the bore of the bushing and also formed about the exterior surface of the bushing, a pin or shaft also having corrugations and extending through the bore and with the corrugations of the pin or shaft engaging in the corrugations of the bore of the bushing, and an outer housing or casing fitted about the exterior surface of the bushing and having corrugations on the interior surface of the housing or casing which engage in the corrugations on the exterior surface of the bushing, said bushing being split along at least one side whereby it may be opened out to facilitate engagement on the shaft again.

2. A bushing construction as claimed in claim 1 in which the bore of the bushing is eccentric relative to the axis of the shaft.

3. A bushing construction as claimed in claim 1 wherein the shaft pin projects from each end of the bushing, and said bushing construction further comprises a bracket or stay secured to each end of the pin or shaft, and an axle to be supported to which the bracket or stay is secured, and a chassis to which said housing is fixed.

4. A bushing construction as claimed in claim 1 and a collar or casing is fitted in tight engagement about the housing, a wheel carrying beam to which said housing is secured, and brackets or stays fixed to each end of the pin or shaft, and a chassis or body on which the wheel carrying beam is mounted and to which said brackets or stays are fixed.

References Cited in the file of this patent

UNITED STATES PATENTS

| | | |
|---|---|---|
| 1,930,067 | Tibbetts | Oct. 10, 1933 |
| 2,004,712 | Thiry | June 11, 1935 |
| 2,437,843 | Van Ness | Mar. 16, 1948 |
| 2,862,740 | Alexander | Dec. 2, 1958 |

FOREIGN PATENTS

| | | |
|---|---|---|
| 618,628 | France | Dec. 20, 1926 |
| 282,188 | Great Britain | July 5, 1927 |
| 149,260 | Austria | Apr. 10, 1937 |
| 1,031,726 | France | Mar. 25, 1953 |